US 7,660,006 B2

(12) United States Patent
Taskett et al.

(10) Patent No.: US 7,660,006 B2
(45) Date of Patent: Feb. 9, 2010

(54) SYSTEM AND METHOD FOR GENERATING SHIPPING LABELS

(75) Inventors: John Taskett, Austin, TX (US); Eitan Suez, Austin, TX (US)

(73) Assignee: Neopost Technologies, Bagneux (FR)

( * ) Notice: Subject to any disclaimer, the term of this patent is extended or adjusted under 35 U.S.C. 154(b) by 1175 days.

(21) Appl. No.: 10/364,648

(22) Filed: Feb. 11, 2003

(65) Prior Publication Data

US 2004/0212833 A1  Oct. 28, 2004

(51) Int. Cl.
*G06Q 30/00* (2006.01)
(52) U.S. Cl. .............................. 358/1.15; 705/1; 705/26
(58) Field of Classification Search ...................... 705/1, 705/8, 20, 26, 27, 37
See application file for complete search history.

(56) References Cited

U.S. PATENT DOCUMENTS

| | | | | |
|---|---|---|---|---|
| 6,167,378 | A * | 12/2000 | Webber, Jr. ....................... 705/8 |
| 6,571,223 | B1 * | 5/2003 | Vaghi ............................ 705/401 |
| 2002/0019759 | A1 * | 2/2002 | Arunapuram et al. .......... 705/7 |
| 2002/0032573 | A1 | 3/2002 | Williams et al. |
| 2002/0032612 | A1 | 3/2002 | Williams et al. |
| 2002/0087371 | A1 * | 7/2002 | Abendroth ...................... 705/7 |
| 2002/0116318 | A1 * | 8/2002 | Thomas et al. ................ 705/37 |
| 2002/0184042 | A1 * | 12/2002 | Hommrich et al. ............. 705/1 |
| 2003/0144871 | A1 * | 7/2003 | Turbeville et al. .............. 705/1 |
| 2004/0254808 | A1 * | 12/2004 | Bennett et al. ................. 705/1 |
| 2005/0137937 | A1 * | 6/2005 | Njo et al. ...................... 705/26 |
| 2005/0171791 | A1 * | 8/2005 | Chimenti et al. ............... 705/1 |
| 2005/0197892 | A1 * | 9/2005 | Bilibin et al. ................. 705/13 |
| 2006/0195364 | A1 * | 8/2006 | Shroff et al. .................. 705/26 |
| 2007/0073551 | A1 * | 3/2007 | Williams et al. ............... 705/1 |
| 2007/0299686 | A1 * | 12/2007 | Hu et al. ........................ 705/1 |

* cited by examiner

*Primary Examiner*—Kimberly A Williams
(74) *Attorney, Agent, or Firm*—Townsend and Townsend and Crew LLP (57) ABSTRACT

A system and method for generating a carrier-compliant shipping label for a supplier to transport a product to a consumer includes determine a shipping rate for a shipping method of a carrier to transport the product to the consumer and determining a time period for transporting the product. The consumer may select the carrier based upon the shipping rate and the time period. Some embodiments generate a carrier-compliant shipping label for the product and deliver the carrier-compliant shipping label to the supplier to transport the product from the supplier to the consumer. In such embodiments, determining a shipping rate may include retrieving the weight and location of the product from the data received from the supplier to determine the rates of a carrier from a rate table or via a carrier interface.

36 Claims, 5 Drawing Sheets

SYSTEM AND METHOD FOR GENERATING SHIPPING LABELS

FIELD OF INVENTION

The present invention relates to the field of consumer/supplier transactions and, more particularly, to a system and method for generating a carrier-compliant shipping label for the supplier to transport a product to the consumer.

BACKGROUND

Suppliers such as manufacturers, wholesalers, retailers, and individuals typically maintain an inventory of products to sell to consumers. Suppliers that regularly maintain or distribute large quantities of one or more types of products negotiate agreements with carriers to facilitate sales to traditionally less sophisticated consumers such as small businesses and individuals. The carriers, such as the United States Postal Service (USPS), United Parcel Service (UPS), Federal Express (FedEx), DHL Airways (DHL), and the like, facilitate the transactions by transporting the product from the supplier's storage facility, or pickup location, to the consumer, or drop-off location. However, the number of carriers, shipping methods offered by the carriers, and costs involved with effective management or administration of the carriers, each having a complex set of rules and rates, makes it economically infeasible for the suppliers to offer a wide variety of carriers and shipping methods. Further, various suppliers realize costs to manage overlapping groups of carriers and distribute the costs by limiting delivery of their respective products to the carriers and shipping methods they selected.

The advent of the Internet and other wide area networks (WANs) provides even individual consumers with sophistication in regards to carriers and shipping methods. For instance, the consumer can locate and access product costs for different suppliers and carrier costs for different carriers with little effort and time with respect to older methods such as calling by telephone or browsing catalogs. As a result, consumers find themselves disadvantaged by the limited shipping options offered by suppliers. In particular, one supplier of a product may offer the product at a lower price than a second supplier but the difference in the overall cost to the consumer for purchasing the product and paying for shipping depends on the shipping options available from the suppliers.

Some current WAN systems attempt to reduce carrier management costs incurred by suppliers by selecting flat shipping rates for products and using a single carrier to transport the product from the supplier to the consumer but these systems simply force some consumers to supplement shipping costs of other consumers. Other WAN systems, such as the systems described in United States patent application 20020032612 and in United States patent application 20020032573, both published Mar. 14, 2002, attempt to address the limited number of shipping options by facilitating management of larger numbers of carriers. These systems, however, increase the complexity of management of the carriers by increasing, for instance, accounting efforts to pay carriers and distribute costs associated with management of the carriers, negotiation efforts to maintain the best rates for carrier accounts for internal and external consumers, and training efforts to train personnel to follow guidelines associated with the rules, rates, and carrier-compliant shipping labels of each carrier.

SUMMARY OF THE INVENTION

The problems identified above are in large part addressed by a system and method for generating a carrier-compliant shipping label for the supplier to transport a product to the consumer. The system determines a shipping rate for a shipping method associated with transport of a product to a consumer from a supplier by a carrier, based upon data received from the supplier and determines a time period for the transport of the product associated with the shipping rate, based upon data received from the carrier. The system communicates with the consumer to select the carrier based upon the shipping rate and the time period. The system may generate a carrier-compliant shipping label for the product and deliver the carrier-compliant shipping label to the supplier to transport the product from the supplier to the consumer. In such embodiments, determining a shipping rate may include retrieving the weight and location of the product from the data received from the supplier to determine the rates of a carrier from a rate table or via a carrier interface. A fee may be added to the actual carrier's rate to pay for generation and maintenance of the web site or consumer interface to facilitate transactions between the consumer and supplier. The system may facilitate the use of carrier accounts to obtain discounted rates from the carriers based upon agreements between the consumer, supplier, or a third party and the carrier.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Following is a detailed description of embodiments of the invention depicted in the accompanying drawings. The embodiments are in such detail as to clearly communicate the invention. However, the amount of detail offered is not intended to limit anticipated variations of embodiments, but on the contrary, the intention is to cover all modifications, equivalents, and alternatives falling within the spirit and scope of the present invention as defined by the appended claims.

generally speaking, a system and method for generating a carrier-compliant shipping label that a supplier can use to transport a product to a consumer are disclosed. The system and method typically determine a shipping rate corresponding to a shipping method associated with transport of a product to a consumer from a supplier by a carrier, based upon data received from the supplier. The system and method also typically determine a time period for transporting the product associated with the shipping rate, based upon data received from the carrier. The system and method may communicate with the consumer to select the carrier based upon the shipping rate and the time period. Some embodiments generate a carrier-compliant shipping label for the product and deliver the label to the supplier. The supplier can use the label transport the product to the consumer. In such embodiments, determining a shipping rate may include retrieving the weight and location of the product from data received from the supplier and using a rate table or a carrier interface to determine the rate. A fee may be added to the actual carrier's rate. Other embodiments may facilitate the use of carrier accounts to obtain discounted rates from the carriers based upon agreements between the consumer, supplier, or a third party and the carrier.

Figure 1:
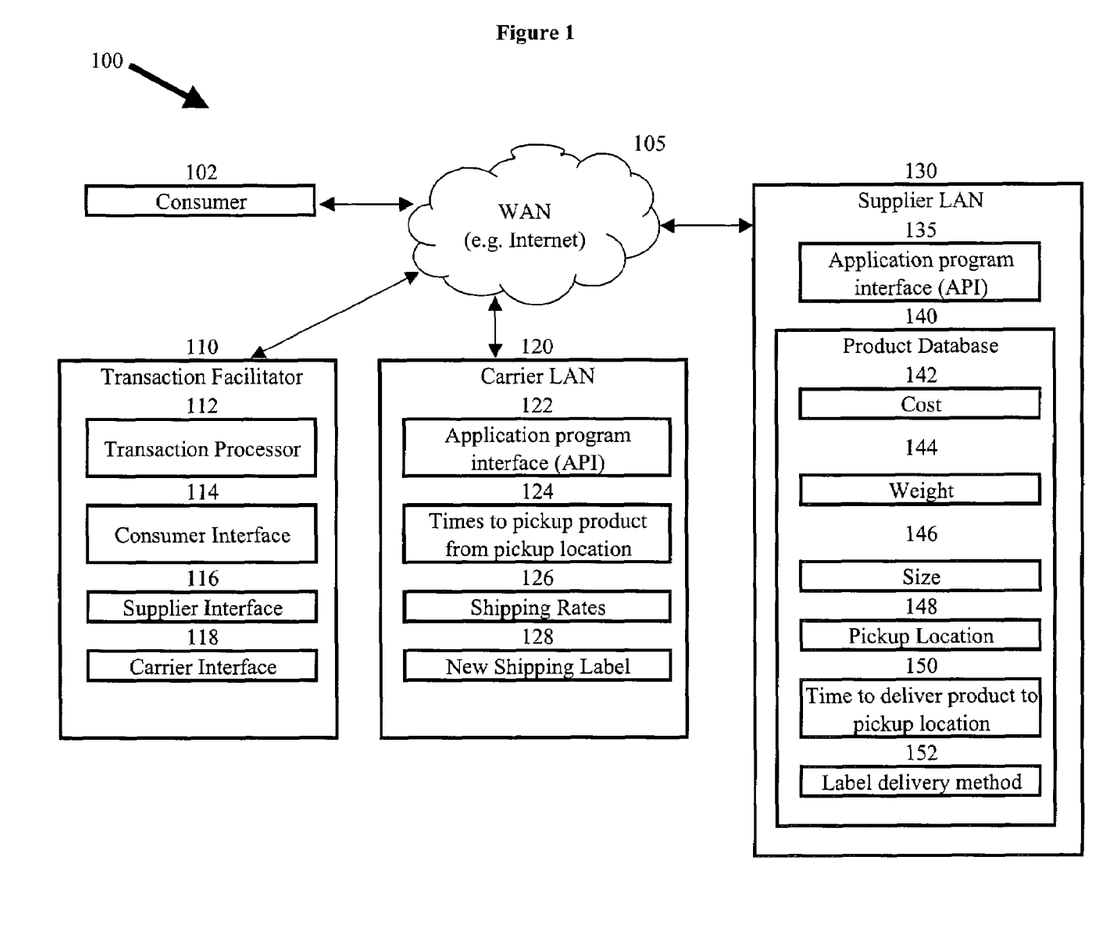
FIG. 1 depicts selected elements of a system for facilitating communication between a consumer and a supplier and for generating a carrier-compliant shipping label for the supplier to transport a product to the consumer according to one embodiment of the invention.

Turning now to the drawings, FIG. 1 depicts selected elements of a system 100 according to one embodiment of the present invention. The depicted embodiment of system 100 includes a wide area network (WAN) 105, a transaction facilitator 110, a carrier server 120, and a supplier server 130. System 100 is suitable for generating a carrier-compliant shipping label that the supplier can use to transport a product to the consumer 102. Wide area network 105 facilitates communication between a consumer 102 and a supplier. Consumer 102 may be a person, business, or the like, connected to WAN 105 to purchase a quantity of one or more products or their equivalent.

WAN 105 may comprise a computer network of a company, the Internet, or the like. Consumer 102 may be connected to WAN 105 via any of a variety of network-aware devices including, for example, a personal digital assistant (PDA) having a wireless connection to the Internet via a cellular phone network. Consumer 102 searches for the product and equivalents via one or more web sites on the Internet such as a web site coupled with consumer interface 114 of transaction facilitator 110.

Transaction facilitator 110 may function as a web site, or part thereof, on WAN 105. Transaction facilitator 110 is configured to facilitate a sale of the product between supplier server 130 and consumer 102. The depicted embodiment of transaction facilitator 110 includes a transaction processor 112, consumer interface 114, a supplier interface 116, and a carrier interface 118. Transaction processor 112 couples with consumer 102 via consumer interface 114 to determine a shipping rate for the product selected by consumer 102 based upon a rate supplied by carrier server 120. Processor 112 may also determine the shipping time period based upon data associated with the product. After consumer 102 selects the shipping rate and purchases the product, processor 112 typically generates a carrier-compliant shipping label based upon the selection of the shipping rate via carrier interface 118. For instance, transaction facilitator 110, or a web site coupled therewith, displays a product offered via supplier server 130 to consumer 102 and consumer 102 requests the shipping rate for the product. Transaction processor 112 determines carrier shipping rates for transporting the product from a location indicated by supplier server 130 to a location indicated by consumer 102 and determines a time period associated with delivery of the product to consumer 102. The delivery time period is typically based on the time for delivery of the product to the pickup location and the pickup time associated with the carrier at the pickup location. Transaction processor 112 may then deliver the shipping rate(s) to consumer 102 in a format that facilitates the consumer's ability to select a carrier based upon a shipping rate and time period. After the sale is completed by consumer 102 and, in some embodiments, confirmed by the supplier via supplier server 130, transaction processor 112 generates a shipping label that is compliant with the selected carrier's specifications and transaction facilitator 110 delivers the label to the supplier by a method indicated by the supplier via supplier server 130. In some embodiments, the shipping rate offered to the consumer includes a fee for handling or facilitating the transaction such as a flat fee, a fee based upon the shipping rate, or the like.

Transaction facilitator 110 may be adapted for a warehouse environment such as a zone-skipper. A zone-skipper refers to a carrier that employs the facilities of the USPS or other common carrier for at least part of a delivery. In a warehouse embodiment, transaction facilitator 110 interacts with a WAN-based system, such as a multi-carrier shipping server or carrier server, and peripherals in an automated or semi-automated way to generate carrier-compliant shipping labels. For example, transaction facilitator 110 may couple with a scale to weigh a package, a barcode reader to determine the product contents and/or package dimensions, a thermal printer to print shipping labels, and the like.

In some embodiments, a third-party web server may add shipping functionality to its web site by accessing transaction facilitator 110 via an API interface identified as supplier interface 116. These embodiments advantageously provide functionality to the third-party web site without changing its look-and-feel. As an example, transaction facilitator 110 may be suitable for use in business-to-business (B2B) e-commerce environments, exemplified by the environments provided by Ariba and its competitors, to facilitate commerce between businesses. For instance, transaction facilitator 110 may conform to rules promulgated by Ariba to provide carrier services for a transaction between supplier server 130 and consumer 102.

In other embodiments, transaction facilitator 110 may be optimized for use in a business-to-consumer (B2C) solution to facilitate commerce between businesses and non-businesses via the Internet. In such embodiments, transaction facilitator 110 may integrate with the checkout process of a particular supplier to offer a consumer 102 with a flexible mechanism for selecting shipment methods, displaying shipping rate options, and proceeding to checkout. The order-taking process may automatically integrate with a back-end system of supplier server 130. For example, shipping labels may be automatically generated, driven by a front-end order taking system, and submitted directly to the supplier's outbound shipping dock ready for pickup by a carrier representative.

In still further embodiments, functionality of system 100 may be incorporated into a returns system to facilitate returns processing. In particular, a carrier-compliant shipping label may be generated for consumer 102 to return a package to a returns facility. In some embodiments, returns facilities may handle returns for all or a selected set of packages based upon the geographic location of the package, the type of product in the package, the reason consumer 102 is returning of the product, or the like.

Consumer interface 114 may communicate with consumer 102 via WAN 105 to receive a selection of a product associated with supplier server 130 and receive a selection of a carrier from consumer 102 based upon a selection of a shipping rate and/or a time period, where the shipping rate and time period are associated with transport of the product to consumer 102 via the carrier. Consumer 102 may enter preferences for shipment such as the carrier, the shipping method, the time period within which consumer 102 wants to receive the product, the maximum cost for shipping, or the like via consumer interface 114. For example, a consumer 102 desiring to receive the product by the next day may enter a preference requiring next day delivery. Transaction processor 112 determines time periods for delivery that include the time required by the supplier to deliver the product to the pickup location and time required by the carrier to pickup and transport the product. Transaction processors 112 also determines shipping rates associated with the time periods and generates a list of the shipping rates for next day delivery to display to consumer 102. Transaction processor 112 may filter or sort the rates displayed to consumer 102 based on the lowest shipping rate(s), fastest delivery time, carrier, and so forth.

Supplier interface 116 couples with transaction processor 112 to receive data associated with the product and to deliver a carrier-compliant shipping label to the supplier with which the supplier can transport the product from the supplier to consumer 102, or a destination provided by consumer 102. In particular, in the present embodiment, supplier interface 116 couples with supplier server 130 via WAN 105 to obtain data about the product offered from a product database 140 such as a cost 142, weight 144, size 146, pickup location 148, time(s) the supplier will deliver product to pickup location 150, and/or label delivery method 152. Supplier interface 116 may access product database 140 via an application program interface (API) 135 of supplier server 130. API 135 may facilitate remote access of product database 140 via WAN 105. For instance, the supplier may sell a large quantity of the products and may routinely receive the products at more than one warehouse or pickup location. In such situations, the supplier can access supplier interface 116 to offer the product for sale, entering cost 142, weight 146, and size 148, where the weight 146 and size 148 are based upon the weight and size of the product when packaged for transport. Once the product is selected by consumer 102, supplier interface 116 may access product database 140 via API 135 to determine the pickup location 148, time(s) to deliver the product to the pickup location 150, and label delivery method 152 for a product of the inventory that the supplier wants to sell or a current location of an inventory of the product. In other embodiments, supplier interface 116 maintains data about currently offered products so a supplier or supplier server 130 may access supplier interface 116 to provide and/or update information about a product such as cost 142, weight 144, size 146, pickup location 148, time(s) to deliver product to pickup location 150 and/or label delivery method 152.

Label delivery method 152 may comprise a preference and related data to indicate the method(s) to use to deliver the carrier-compliant shipping label to the supplier. For example, label delivery method 152 may comprise an email address, a facsimile number, a representation for a web server, and/or a mailing address. In embodiments that deliver the carrier-compliant shipping label to a web server or email address, label delivery method 152 may further comprise, for instance, a file format preference for the carrier-compliant shipping label such as a preference for a portable document format (PDF), a version of a word processor, a graphics compression format, or the like.

Carrier interface 118 couples with carrier server 120 via WAN 105 and transaction processor 112 to determine shipping rates, determine delivery times, and generate a carrier-compliant shipping label. More specifically, carrier interface 118 is configured to access carrier server 120 via API 122 to obtain times to pickup product from pickup location 124 and shipping rates 126 for transaction processor 112. Carrier server 120 may represent a network of a carrier such as USPS, UPS, FedEx, DHL, and the like and, in many embodiments, carrier server 120 can provide rack rates and discounted rates based upon the pickup location and drop-off location for the product. The rack rates may be available to everyone. The discounted rates may be based upon volume packages transported for a customer and/or other factors. Carrier interface 118 can access the rack rates and/or discounted rates for one or more customer accounts of carrier server 120 based upon data gathered for transaction processor 112. For example, customer interface 114 may receive information about one or more accounts from consumer 102, supplier interface 116 may receive information about one or more accounts from supplier server 130, and other parties to the transaction may provide account information to transaction processor 112. Carrier interface 118 gathers the rates for shipment of the product for all the) accounts associated with the transaction to offer consumer 102 the most favorable shipping rates for the transaction.

Once the shipping rates 126 are received from one or more carriers, transaction processor 112 determines the time period for delivery associated with each rate and transmits the shipping rates to the user in the form of a list or chart including, for instance, the rate, time period, carrier, shipping method, and/or an indication regarding whether the account associated with the shipping rate is an account of consumer 102. After consumer 102 selects a shipping rate and confirms the purchase of the product, transaction processor 112 receives payment information from consumer 102 and verifies approval of payment. Then carrier interface 118 procures a carrier-compliant shipping label or data associated with the carrier-compliant shipping label from carrier server 120 to attach to the product for transport from the pickup location to consumer 102. In some embodiments, transaction processor 112 may generate a new shipping label 128 via carrier interface 118 and API 122 and receive new shipping label 128 from carrier server 120. In other embodiments, carrier interface 118 may receive data from new shipping label 126, such as a tracking number, reference number, and the like, and transaction processor 112 may generate the shipping label in accordance with specifications associated with the selected carrier.

The generated carrier-compliant shipping label is delivered to the supplier in accordance with label delivery method 152. For example, if label delivery method 152 indicates that the supplier wants to receive the shipping label along with an inventory and shipping receipt in the form of a PDF file attached to an email addressed to the supplier's shipping email server. Transaction processor 112 generates a PDF file or converts an electronic version of the shipping label to a PDF file comprising the carrier-compliant shipping label and attaches a second PDF sheet to the file including an inventory and shipping receipt to the PDF file. The PDF file is then forwarded to the supplier's email server either immediately after generating the file, at the end of the day, or at a time specified in label delivery method 152. Once the email is received, the supplier advantageously uses the carrier service selected by consumer 102 by simply printing the label and receipt, attaching the label to the product indicated, filing the inventory and shipping receipt, and delivering the product to the pickup location specified by the supplier.

Figure 2:
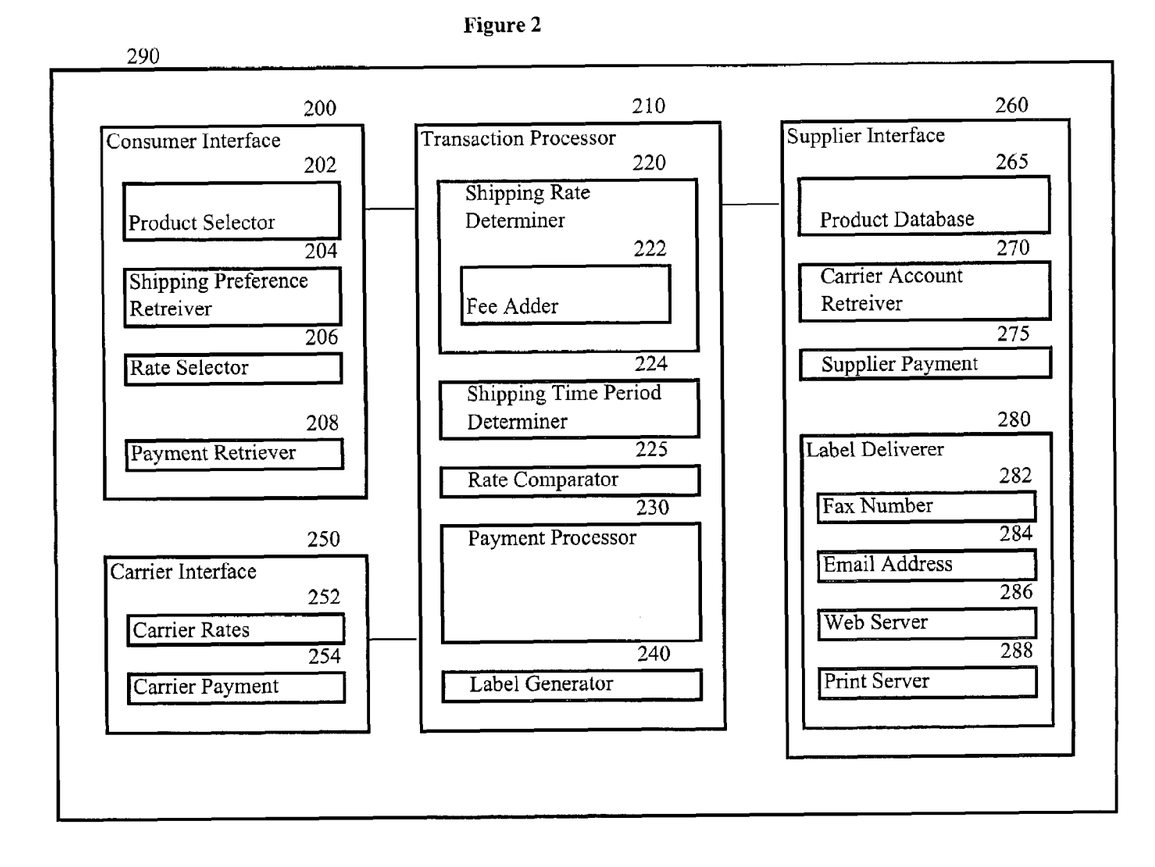
FIG. 2 depicts selected elements of a transaction facilitator for generating a carrier-compliant shipping label according to one embodiment of the invention.

Referring now to FIG. 2, an embodiment of a transaction facilitator 290 suitable for generating a carrier-compliant shipping label for a supplier to transport a product to a consumer is shown. Transaction facilitator 290 comprises a consumer interface 200, a transaction processor 210, a carrier interface 250, and a supplier interface 260. Consumer interface 200 may be configured to communicate with a consumer to select a product associated with a supplier, and receive a carrier selection from the consumer. In some embodiments, the consumer may provide criteria to consumer interface 200 to select a product and shipping rate along with payment information so that consumer interface 200 can make the purchase as soon as a product meeting certain criteria becomes available. For example, a consumer may wish to purchase a business telephone on an auction web site. The consumer may know or assume that the product will be available and may want to purchase the product so long as the cost of the product does not exceed a specified cost. A product selector 202 provides the consumer with a list of products in the form of, for example, a graphical user interface (GUI) with pictures and/or descriptions of the product, and provides the option for the consumer to enter a make and model number as criteria for searching for and/or selecting the product. A shipping preference retriever 204 provides the consumer with a GUI to specify the shipping location and the consumer's preferences with regards to carriers, time periods for delivery, shipping methods, maximum cost, range of costs, and carrier accounts. A rate selector 206 provides the consumer with the option to view the shipping rates or automatically select the lowest rate based upon the shipping preferences. And a payment retriever 208 allows the consumer to enter a method of payment such as a credit card, debit card, or other electronic funds transfer for automatic purchase of the business telephone if the telephone becomes available in accordance with the preferences indicated. In other situations, the consumer may not set the purchase for automatic, but may enter all the other preferences and may set a notification preference so that the consumer is notified when the product becomes available.

In some embodiments, product selector 202 facilitates selection of more than one product or more than one supplier for a product and rate selector 208 provides a list or grid of shipping rates for each of the more than products and/or suppliers along with an overall cost calculation. Thus, the consumer may advantageously compare the shipping rates between two suppliers when, for example, the suppliers offer the same product at different prices and/or store the same product at different locations. Consumer interface 200 may offer to display shipping rates for the same products from different suppliers or equivalent products. In some of these embodiments, consumer interface may offer to find the lowest combination of shipping rates and product cost for the consumer based upon the consumer's preferences.

Transaction processor 210 processes data received via consumer interface 200, carrier interface 250, and supplier interface 260 to consummate the transaction and facilitate transportation of the product via a carrier from the supplier to the consumer. The depicted embodiment of transaction processor 210 includes a shipping rate determiner 220, a shipping time period determiner 224, a rate comparator 225, a payment processor 230, and a label generator 240. Shipping rate determiner 220 retrieves rates from carrier interface 250 for transporting a product from a pickup location indicated by supplier interface 260 to a consumer location indicated by consumer interface 200. Shipping rate determiner 220 may include a fee adder 222 to add a handling fee to the carrier's rate for the transaction based upon the carrier's rate, a percentage of the carrier's rate, the supplier, or other criteria. In some embodiments, shipping rate determiner 220 may include or use a universal rating engine that determines rates associated with any specific carrier based upon a set of criteria or rules associated with carriers generally. The universal rating engine would eliminate the need to implement a different rate engine for each carrier.

Shipping time period determiner 224 would likely determine a time period associated with a shipping rate. For example, FedEx and UPS ground transit times vary based upon the distance between the pickup location and drop-off location. When the supplier is near the consumer, the distance may be within a next day delivery range for ground transportation by UPS but not within the next day delivery range for ground transportation by FedEx, or vice versa. Shipping time period determiner 224 determines that UPS offers next day delivery via a ground transportation rate and a next day rate but FedEx only offers next day delivery via a next day rate for this transaction. Thus, shipping time period determiner 224 associates the ground transportation rate of UPS with next day delivery and that rate is presented to the consumer.

Rate comparator 225 may compare rates and offer the best rates to the consumer based upon consumer preferences, if any. For example, the consumer may want to ship a product by FedEx for next day delivery and the product selected by the consumer may be offered by supplier one at a first location and supplier two at a second location. Shipping rate determiner 220 requests rates from carrier interface 250 for transporting the product from the first location to the consumer location and from the second location to the consumer location. Shipping time period determiner 224 requests times to pickup the product at each location. The product offered by supplier one is less than the product offered by supplier two but based upon the delivery times to the pickup location, shipping time period determiner 224 determines that supplier one is unable to deliver the product to the carrier in time for next day delivery by ground service. However, shipping time period determiner 224 determines that supplier two is able to deliver the product to the pickup location for next day delivery by ground service and that the rate for ground service from supplier two is less than air service from supplier two. Thus rate comparator 225 presents the shipping rate for air service from supplier one and the shipping rate for ground service for supplier two. In some of these situations, the difference between the shipping rates may be greater than the difference between the prices for the product from the different suppliers.

Payment processor 230 receives payment information from the consumer via consumer interface 200 and processes payments for the fee, carrier rate, and the product cost. In particular, payment processor 230 processes the total cost of the product with the shipping rates using the consumer's payment information. Upon confirming payment, payment processor pays the fee, pays the shipping rate to the carrier via carrier interface 250 to procure a tracking number, shipping label, or shipping label information, and pays the supplier for the product. In some embodiments, the payment of the fee and/or product cost may be held until confirmation is received indicating that the product has shipped. In other embodiments, payment processor 230 may retrieve carrier account information associated with the consumer either from the consumer or from an account data file associated with the consumer. The carrier account number(s) may then be forwarded to the carrier to procure a shipping label and the fee, if any, may be charged via a periodic or separate invoice.

Label generator 240 couples with carrier interface 250 to generate a carrier-compliant shipping label. In particular, carrier interface 250 obtains shipping label information from the carrier and/or interfaces with the carrier to procure the shipping label from the carrier. For example, FedEx may provide an API interface and carrier interface 250 may be configured to transact with the API of FedEx to procure a shipping label. FedEx may offer data to print the shipping label in an electronic form to label generator 240. Then, label generator 240 may convert the label into a format(s) indicated by the corresponding supplier of the product.

In accordance with the format(s) indicated by the supplier, label generator 240 may create an image of the shipping label in the form of an electronic document such as html or a portable document format (PDF), or the like and couple with supplier interface 260 to determine the format for delivery of the shipping label to the supplier and, in some instances, to deliver the label to the supplier. For example, supplier interface 260 may comprise preferences to indicate the shipping label should be faxed, emailed, attached to a link on a web site, and/or printed and mailed to the supplier.

Carrier interface 250 may communicate with a carrier such as a carrier web site or server to receive rates for shipment of a product from a product location to a consumer location based upon rack rates or discount rates, to obtain data to generate a carrier-compliant shipping label, and in some embodiments, to pay the carrier. Carrier interface 250 comprises carrier rates 252 and a carrier payment unit 254. Carrier rates 252 is a database that includes rates for a selected carrier, some of which may comprise discounted rates for a supplier, a consumer, or a third party to the transaction, and other rates may comprise rack rates. Carrier interface 250 is also preferably configured to update carrier rates 252 via communication with the carrier(s). Carrier interface 250 may update carrier rates 252 in response to a request from transaction processor 210. In particular, each rate in the carrier rate 252 database may include an expiration date and when the rate requested by transaction processor 210 has expired, carrier interface 250 may interface with a carrier web site to update the rates.

Carrier payment unit 254 couples with transaction processor 210 to obtain payment information associated with transporting a product from a supplier to a consumer. Carrier payment unit 254 also communicates with the carrier to make payment according to a shipping rate and to acquire a shipping label or information to generate a shipping label. In other embodiments, transaction processor 210 may provide a supplier's payment information to carrier payment unit 254 and carrier payment unit 254 may then procure the shipping label with the payment information of the supplier.

Supplier interface 260 couples to transaction processor 210 to provide an interface to a supplier. A supplier or a supplier server communicates with supplier interface 260 to provide data about a product and about the supplier. The depicted embodiment of supplier interface 260 includes a product database 265, a carrier account retriever 270, a supplier payment 275, and a label deliverer 280. Product database 265 includes data about a product such as the product's weight, size, pickup location, cost, and the like. Product database 265 may also include information regarding the time a product will be ready for pickup based upon the time an order is received and the latest time the product can be picked up.

In some embodiments, carrier account retriever 270 collects information regarding agreements between a supplier and carriers. The account information may then be advantageously used to help determine the best shipping rates for a consumer. For example, the supplier uses UPS to receive parts in large volumes each month. UPS, in return, provides discounted rates for other shipments handled for the supplier by UPS. In addition to acquiring rack or standard rates for shipping the product from the supplier to the consumer by various carriers, transaction processor 210 can present the consumer with a summary comparison of overall costs including the product cost and the discounted and/or standard shipping rates based upon purchasing the product from different suppliers.

Supplier payment unit 275 may interface with a supplier server or a bank to transfer payment to the supplier in response to receipt of payment for a product from a consumer. In some embodiments, supplier payment unit 275 may provide payment information for the carrier's rate when the supplier is paying for delivery of the product to the consumer.

Label deliverer 280 receives shipping label delivery preferences from the supplier such as a fax number 282, an email address 284, a web server 286, and/or a print server 288. Fax number 282 may comprise one or more fax numbers to deliver the shipping label to the supplier via facsimile. Email address 284 may comprise one or more email addresses as well as an indication regarding a file format for delivering the shipping label to the supplier. Web server 286 may comprise an indication that the shipping label is to be delivered via a link in a web site, such as a web site that is part of supplier interface 260. Print server 288 may be selected to indicate that the shipping label is to be delivered via mail. In such embodiments, label deliverer 280 prints the shipping label. Such embodiments are particularly advantageous when printing and sending a large number of labels. For instance, a consumer may want to ship a large number of packages from a dock in a remote location that does not have access to computers or the Internet. The consumer may select print server 288 to print the corresponding large number of shipping labels and have the shipping labels mailed to the dock. In further embodiments, one or more of these preferences for delivery may be selected.

In some embodiments, delivering the shipping label to the supplier may occur as the products are purchased. On the other hand, when a supplier may sell to a significant number of customers and does not maintain a staff to handle the shipping labels, the supplier may want to receive the shipping labels all at once near the end of the day. Thus, label deliverer 280 may comprise a preference that can be set to indicate that the shipping labels should be delivered at one time or multiple times during the day.

Figure 3:
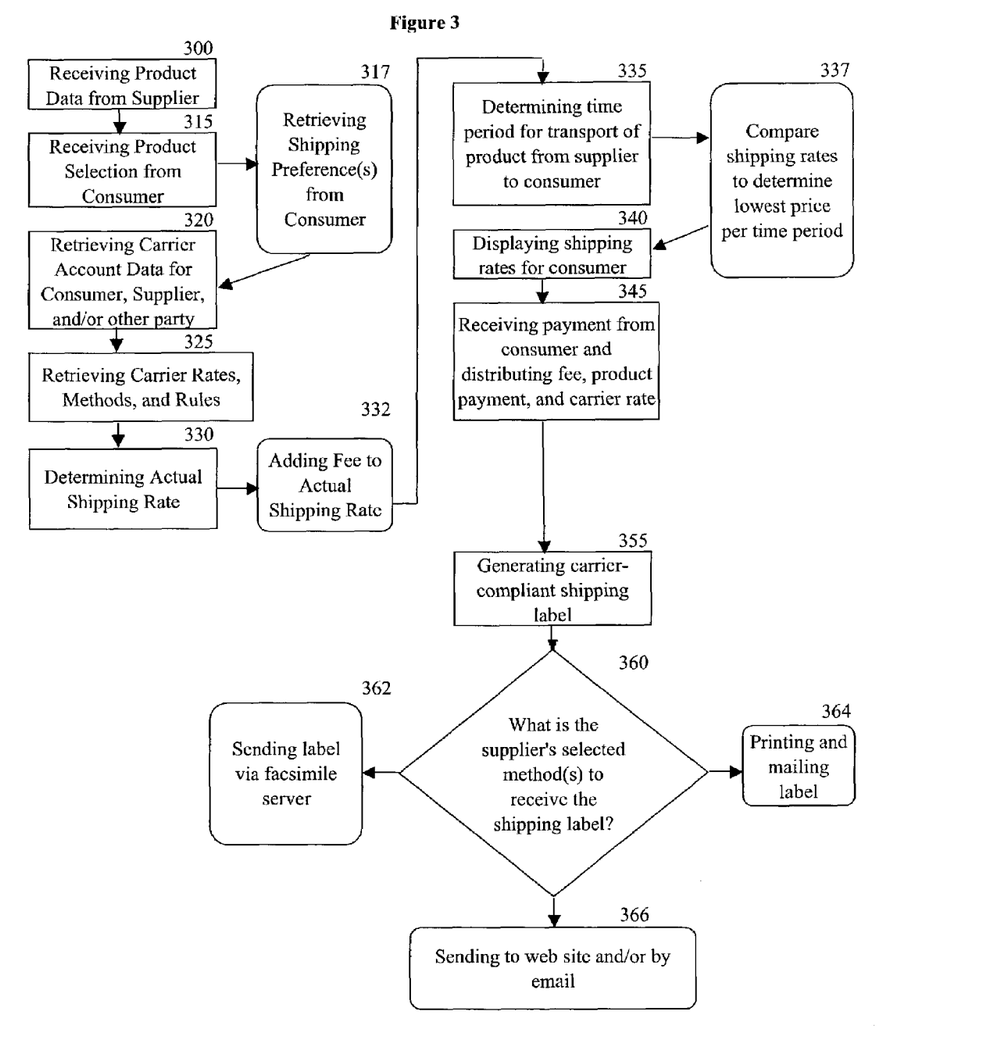
FIG. 3 is a flow chart of a method for generating a carrier-compliant shipping label according to one embodiment of the invention.

FIG. 3 depicts an example flow chart of a method 390 for generating a carrier-compliant shipping label for the supplier to transport a product to the consumer. Method 390 illustrates a progression of a transaction from registration of a product with a server through delivery of a shipping label to the supplier. Method 390 includes receiving product data (block 300) from the supplier to register the product with the system. Receiving product data may include receiving the cost, weight, size, and location of the product or the package containing the product. Registering the product may also include describing time frames for delivery of the carrier-compliant shipping label with respect to time frames to prepare and deliver the package for pickup at the pickup location.

Method 390 further includes receiving a product selection (block 315) from a consumer. The receipt of a product selection may including providing a consumer with a list of products offered by one or more suppliers. The consumer may select a product based on price or may decide to pick several of the products from different suppliers to determine which supplier's product can be delivered at the lowest overall cost. The receipt of a product selection from the consumer identifies one or more suppliers as a basis for determining shipping rates and time periods.

After the consumer selects one or more products, shipping preferences are retrieved (block 317) from consumer. In addition to enabling the consumer to specify a preferred carrier, delivery date, and so forth, specifying shipping preferences may enable the consumer to comparison shop a product or find shipping rates for a group of products. For example, if a consumer selects more than one product from a supplier, the consumer interface may ask if the consumer wants to find the lowest shipping rate for the group of products. If the consumer selects multiple products that are substantially equivalent, the consumer interface may ask if the consumer wants to comparison shop the overall costs for delivery one product.

Retrieving shipping preferences from consumer (element 317) may be designed to elicit answers from the consumer to narrow down the amount of shipping rate information to present to the consumer, advantageously reducing the amount of time and effort that the consumer invests in selecting the carrier with the best shipping rate. For instance, the consumer interface may allow the consumer to search for the lowest shipping rate for one or more time frames for delivery of the product. In other embodiments, the consumer interface may request a price range for shipping rates to display and the carrier(s) to display, and restrict the display of shipping rates to that price range and those carriers.

Carrier account data is retrieved (block 320) for the consumer, supplier, and/or other party. The retrieval of this carrier account data may facilitate the determination of the best rates available for the transaction. In particular, two or more parties involved with the transaction may have negotiated discount rates with carriers. By requesting rates based upon carrier account numbers, the discount rates can be compared to each other and to standard rates.

Carrier rates, methods, and rules are retrieved (block 325) by communicating with a carrier server or system to obtain the rates associated with shipment of the product to the consumer as well as the rules and methods to determine the time period associated with delivery of the product. In some embodiments, the rates of some carriers may be manually entered into a database. Rates of other carriers may be parsed from a web site with a parsing engine while still other carriers may include an API to obtain the actual shipping rates. The rules associated with the rates may indicate the areas or locations of the origin and destination of the product to select the correct rate. The rules may also indicate times for delivery within different areas based upon the time the product is picked up.

An actual shipping rate may be determined (block 330) to indicate the rate that the carrier will charge for the transporting the product from the supplier to the consumer based upon the locations of the supplier and consumer and the method of delivery selected for the product. Other embodiments may acquire the specific rates directly from the carrier based upon communicating information regarding the method of delivery, the size and weight of the product, the product's location and the consumer's location.

A fee may be added (block 332) to the actual shipping rate. This added fee may include a fee for facilitating the selection of carriers for the consumer by generating and delivering a carrier compliant shipping label to the supplier. Any added fee may also include a fee for a web site or server involved with providing an interface between the suppliers and consumers to facilitate transactions.

A time period is determined (block 335) for transport of a product from a supplier to a consumer. The transport time period may be determined by applying the rules and pickup times of the carrier against the time the supplier is to deliver the product to the pickup location to determine the amount of time the carrier promises to deliver the product to the consumer. The time period is then associated with the corresponding shipping rate to determine the delivery dates and times. In several embodiments, a deadline may be determined to inform the consumer when a shipping rate will no longer be valid for the associated delivery time.

Shipping rates may be compared (block 337) to determine the lowest price per time period by comparing the rates associated with delivery within a time period and ordering or sorting the rates from lowest to highest. In many embodiments, the shipping rate corresponding to the consumer's preference(s) is selected. In other embodiments, a number of the rates such as the higher rates may be removed from consideration based upon preferences indicated by the consumer.

Shipping rates are then displayed (block 340) to show the consumer some or all of the determined rates, with or without the added fee. The rates can be displayed in a list ordering rates by cost, delivery dates and times, shipping methods, and the like. In many of these embodiments, the consumer may reorder the rates by indicating a desirable order. Each of the shipping rates may also be individually deleted from the display after the consumer eliminates the shipping rate. In other embodiments, the rates may be displayed in a grid displaying criteria such as cost, delivery dates and times, and shipping methods, and criteria may be deleted or added in accordance with a preference of the consumer. In further embodiments, the rates may also be ordered or displayed in a grid by carrier.

Referring still to FIG. 3, payment information is received from the consumer (block 345). The payment information typically includes credit card or electronic fund transfer information. Portions of the payment may be distributed to respective parties to the transaction. Any added fee, for instance, may be transmitted to the party maintaining the web site and consumer interface, while the product payment may be applied to the corresponding supplier's account, and the carrier rate may be submitted to the carrier to procure transport of the product from the supplier to the consumer. In other embodiments, the consumer may provide one or more account numbers for carriers and the account numbers may be provided to a carrier API to generate a carrier-compliant shipping label.

A carrier-compliant label is generated (block 355) via the carrier's API. In some embodiments, generating the carrier-compliant label includes receiving label information from the selected carrier and creating an image of a label based upon label information received from the carrier's API. Receiving label information from the selected carrier's API may include receiving the shipping label in electronic form configured for printing or receiving information to print on a carrier-compliant label such as a reference number and bar code or the like. The label information may be received in response to payment applied toward the transportation of the product from the supplier to the consumer or a carrier account number and may also represent notice to the carrier to pick up the product at the pickup location. The generation of a label may also initiate creation of a corresponding entry in a transaction log from which reports such as a daily manifest of shipping transactions may be provided to the carrier.

Upon generating a carrier-compliant label, data received from the supplier may be used to determine (block 360) the supplier's selected method(s) to receive the shipping label. In other embodiments, communication with the supplier server may provide the supplier's preferences with regards to receiving the shipping label. The present embodiment delivers the carrier-compliant shipping label to the supplier via facsimile (block 362), by linking an electronic document comprising the carrier-compliant shipping label to a web site or emailing the electronic document to the supplier (block 366), and/or by printing a physical copy of the label and mailing the label to the supplier (block 364). In many of these embodiments, the shipping label may be generated along with a receipt and/or packing list.

Figure 4:
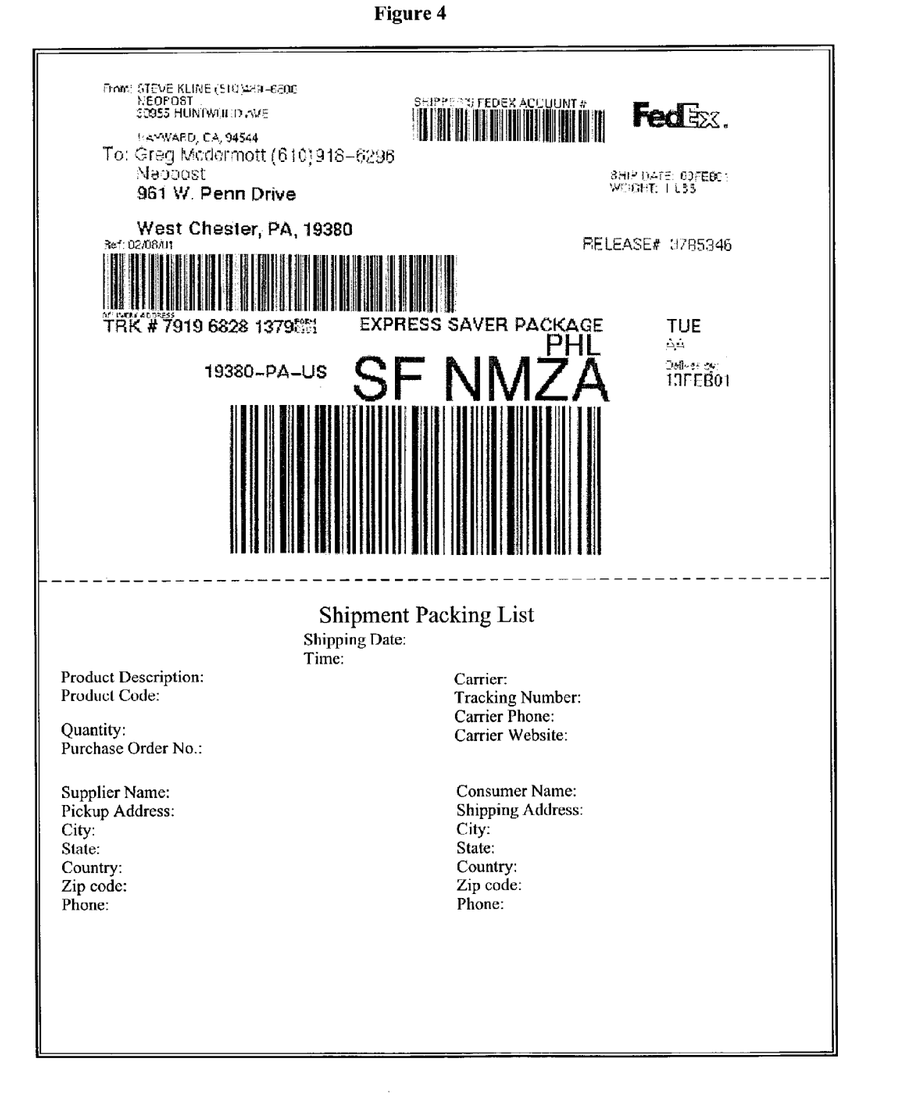
FIG. 4 depicts an embodiment of a carrier-compliant shipping label.

FIG. 4 illustrates an example of a carrier-compliant shipping label with a shipping receipt for FedEx. The shipping label is above the dashed line and the receipt is below the dashed line. In further embodiments, a copy of the receipt and/or packing list may be delivered to the consumer also.

Figure 5:
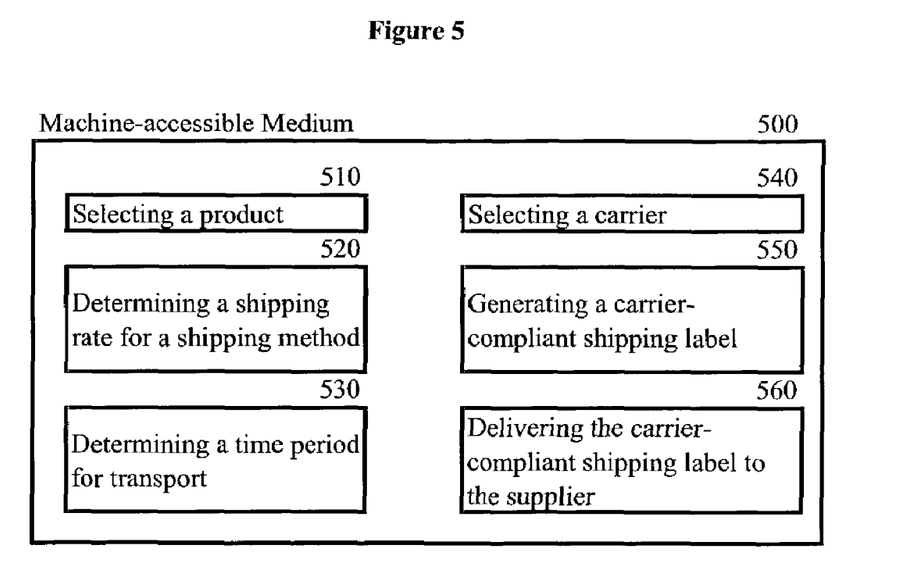
FIG. 5 depicts a machine-accessible medium having instructions for generating a carrier-compliant shipping label according to one embodiment of the invention.

Referring now to FIG. 5, a machine-accessible medium embodiment of the present invention is shown. A machine-accessible medium includes any mechanism that provides (i.e. stores and or transmits) information in a form readable by a machine (e.g., a computer), that when executed by the machine, can perform the functions described herein. For example, a machine-accessible medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.). The present invention may include more than one machine-accessible medium depending on the design of the machine.

The medium 500 may include code or computer executable instructions for selecting a product 510, determining a shipping rate for a shipping method 520, determining a time period for transport 530, selecting a carrier 540, generating a carrier-compliant label 550, and delivering the carrier-compliant label to the supplier 560. The code means for selecting a product 510 may comprise instructions for selecting a product based upon consumer preferences and selecting a product in response to a consumer selection. Selecting a product based upon consumer preferences may include selecting a product based upon a search performed by a consumer and search criteria. Selecting a product in response to a consumer selection may select a product based upon selection of an image and/or product description by a consumer. The selected product is then be associated with one or more suppliers that offer the product for sale.

Code 520 for determining a shipping rate for a shipping method may include instructions for calculating a shipping rate associated with a shipping method such as same day delivery, next day delivery, second day delivery, or the like based upon rate table and the weight and dimensions, or size, of the product. In many embodiments, the rates may be determined via a rate table for each shipping method.

Code 530 for determining a time period for transport may include instructions for determining a time period associated with a shipping rate such as a ground shipping rate wherein the time period for delivery varies based upon the pickup location for the product and the drop-off location for delivering the product to the consumer. Code 530 may also associate the time period with the shipping rate and method to facilitate comparison of the rates associated with each time period from one or more carriers.

Code 540 for selecting a carrier may include instructions to select a carrier in response to a selection of the shipping rate and time period by the consumer. In many embodiments, selecting the shipping rate involves a confirmation by the consumer to purchase the product. For instance, such embodiments comprise instructions to display the shipping rates in the form of a table with a 'buy it now' button or the like. When the consumer has entered billing information, selection of the shipping rate initiates the purchase of the product. On the other hand, when the consumer has not yet entered billing information, code 540 may include instructions to request billing information from the consumer.

Code 550 for generating a carrier-compliant label may include instructions to couple with the carrier server to acquire a shipping label, or the information to create a shipping label. In some embodiments, acquiring a shipping label may involve instructions to purchase the label. In other embodiments, the shipping may be paid upon delivery of the product to the consumer.

Code 560 for delivering the carrier-compliant shipping label to the supplier may provide the supplier with an electronic representation of the shipping label that can be printed and attached to the product. In such embodiments, the shipping label complies with labels for the carrier or is an equivalent to the shipping labels provided directly by the carrier, advantageously relieving the supplier of a function of management and administration of the carrier. In particular, the supplier attaches the shipping label to the product or product package and leaves the product at the pickup location designated by the supplier at the next time designated by the supplier as a pickup time and the supplier may have no further contact with the carrier to transport the product to the consumer.

It will be apparent to those skilled in the art having the benefit of this disclosure that the present invention contemplates methods and arrangements to generate a carrier-compliant shipping label for the supplier to transport a product to the consumer, in many embodiments, advantageously providing the consumer with more control over the selection of carriers and shipping methods, and, in some embodiments, relieving the supplier of a function associated with management and administration of carriers and shipping methods. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method, comprising:
    determining a shipping rate for a shipping method associated with transport of product to a consumer from a supplier by a carrier, the shipping rate based upon a carrier account of the consumer;
    determining a time period for the transport of the product associated with the shipping rate, based upon data received from the carrier;
    communicating with the consumer to select the carrier based upon the shipping rate and the time period;
    generating a carrier-compliant shipping label for the product; and
    delivering the carrier-compliant shipping label to the supplier to transport the product from the supplier to the consumer.

2. The method of claim 1, wherein determining a shipping rate comprises retrieving the weight and location of the product from the data received from the supplier.

3. The method of claim 1, wherein-determining a shipping rate comprises selecting a rate from a rate table associated with the carrier.

4. The method of claim 3, wherein determining a shipping rate comprises adding a fee to the rate.

5. The method of claim 3, wherein the rate table is associated with a carrier account provided by the supplier.

6. The method of claim 5, wherein the rate table further comprises a plurality of entries, each entry associated with a different seller for the same product, each of said entries containing the overall cost of the product and the carrier rate.

7. The method of claim 1, wherein determining a time period comprises comparing a pickup time associated with the carrier at a pickup location against a delivery time associated with delivery of the product to the pickup location.

8. The method of claim 1, wherein communicating with the consumer comprises delivering the shipping rate and the time period to the consumer; and receiving a selection associated with the carrier in response to said delivering.

9. The method of claim 1, wherein generating a carrier-compliant shipping label comprises communicating with an application program interface associated with the carrier to obtain data to generate the carrier-compliant shipping label.

10. The method of claim 1, wherein generating a carrier-compliant shipping label comprises generating a carrier-compliant shipping label via an application program interface associated with the carrier.

11. The method of claim 1, wherein delivering the carrier-compliant shipping label comprises providing a link to the carrier-compliant shipping label on a wide area network.

12. The method of claim 1, wherein delivering the carrier-compliant shipping label comprises faxing the carrier-compliant shipping label.

13. The method of claim 1, wherein delivering the carrier-compliant shipping label comprises delivering the carrier-compliant shipping label in a manner indicated by the data received from the supplier.

14. The method of claim 1, wherein determining a shipping rate comprises selecting a rate from a rate table associated with the carrier based upon a drop-off location received from the consumer and a pickup location received from the supplier.

15. The method of claim 1, wherein the shipping rate is a discounted rate provided to the supplier by the carrier.

16. The method of claim 1, wherein communicating with the consumer comprises:
   providing a plurality of shipping rates to the consumer, each of the plurality of shipping rates based upon data received from one of a plurality of carriers; and
   receiving a selection of the carrier from the consumer.

17. An apparatus, comprising:
   a shipping rate determiner to determine a rate to transport a product from a pickup location associated with a supplier to a drop-off location selected by a consumer, the rate based upon a carrier account of the consumer;
   a time period determiner to determine the time period to transport the product from the pickup location to the drop-off location based upon the shipping rate in accordance with data received from a carrier; and
   a label generator configured to communicate with the carrier to generate a carrier-compliant shipping label, wherein the carrier-compliant shipping label is to be delivered to the supplier to transport the product from the pickup location to the drop-off location.

18. The apparatus of claim 17, further comprising a consumer interface to receive data to identify the product and the drop-off location from the consumer.

19. The apparatus of claim 18, wherein the consumer interface comprises a payment retriever to receive a payment for the shipping rate and the product from the consumer.

20. The apparatus of claim 18, wherein the carrier is selected by the consumer, the consumer interface further to receive the selection of the carrier from the consumer.

21. The apparatus of claim 17, further comprising a payment processor to process billing information of the consumer to pay the carrier and the supplier.

22. The apparatus of claim 17, further comprising a rate comparator to compare the shipping rate with other shipping rates associated with the time period.

23. The apparatus of claim 17, wherein the shipping rate determiner is configured to obtain a rate associated with an account number provided by the carrier, wherein the account number identifies an agreement with the carrier.

24. A system, comprising:
   a consumer interface to communicate with a consumer to receive a selection of a product associated with a supplier and to receive a selection of a carrier from the consumer based upon a shipping rate and a time period, wherein the shipping rate and the time period are associated with transport of the product to the consumer by the carrier;
   a transaction processor coupled with the consumer interface to determine the shipping rate based upon a rate supplied by the carrier and a carrier account of the consumer, determine the time period based upon data associated with the product; and generate a carrier-compliant shipping label based upon the selection of the carrier via a carrier interface; and
   a supplier interface coupled with the transaction processor to receive the data associated with the product and to deliver the carrier-compliant shipping label to the supplier to transport the product from the supplier to the consumer.

25. The system of claim 24, wherein the consumer interface comprises a shipping preference retriever to adjust a content of a list of shipping rates based upon a preference of the consumer.

26. The system of claim 24, wherein the label generator is configured to communicate with an application program interface of the carrier to create an image of the carrier-compliant shipping label.

27. The system of claim 24, wherein the supplier interface comprises a label deliverer to deliver the carrier-compliant shipping label to the supplier.

28. The system of claim 24, wherein the consumer interface comprises a product selector that displays a plurality of entries, each entry corresponding to a different supplier for the same product, and each of said entry containing the total cost calculation of the product and the carrier rate.

29. A computer readable storage medium storing a plurality of instructions, which when executed by a machine, cause said machine to perform operations, comprising:
   determining a shipping rate for a shipping method associated with transport of a product to a consumer from a supplier by a carrier, the shipping rate based upon a carrier account of the consumer;
   determining a time period for the transport of the product associated with the shipping rate, based upon data received from the carrier;
   communicating with the consumer to select the carrier based upon the shipping rate and the time period;
   generating a carrier-compliant shipping label for the product; and
   delivering the carrier-compliant shipping label to the supplier to transport the product from the supplier to the consumer.

30. The computer readable storage medium of claim 29, wherein determining a shipping rate comprises selecting a rate from a rate table associated with the carrier based upon a drop-off location received from the consumer and a pickup location received from the supplier.

31. The computer readable storage medium of claim 30, wherein determining a shipping rate further comprises adding a fee to the rate.

32. The computer readable storage medium of claim 30, wherein the rate table further comprises a plurality of entries, each entry associated with a different seller for the same product, each of said entries containing the overall cost of the product and the carrier rate.

33. The computer readable storage medium of claim 29, wherein determining a time period comprises comparing a pickup time associated with the carrier at a pickup location against a delivery time associated with delivery of the product to the pickup location.

34. The computer readable storage medium of claim 29, wherein generating a carrier-compliant shipping label comprises communicating with an application program interface associated with the carrier to obtain data to generate the carrier-compliant shipping label.

35. The computer readable storage medium of claim 29, wherein generating a carrier-compliant shipping label comprises generating a carrier-compliant shipping label via an application program interface associated with the carrier.

36. The computer readable storage medium of claim 29, wherein delivering the carrier-compliant shipping label comprises facilitating access by the supplier to the carrier-compliant shipping label via a wide area network.

\* \* \* \* \*